(No Model.)

G. ROWELL.
TUBULAR SAW.

No. 303,950. Patented Aug. 19, 1884.

WITNESSES:
N. A. Clark,
M. E. Fowler

INVENTOR,
Granville Rowell
by Geo Walker
atty.

UNITED STATES PATENT OFFICE.

GRANVILLE ROWELL, OF CLAREMONT, ASSIGNOR TO THE ROWELL TUBULAR SAW COMPANY, OF MANCHESTER, NEW HAMPSHIRE.

TUBULAR SAW.

SPECIFICATION forming part of Letters Patent No. 303,950, dated August 19, 1884.

Application filed October 3, 1883. (No model.)

*To all whom it may concern:*

Be it known that I, GRANVILLE ROWELL, of Claremont, in the county of Sullivan and State of New Hampshire, have invented a new and useful Improvement in Sawing-Machines; and I do hereby declare that the following is a full and exact description of the same, reference being had to the accompanying drawings, and to the letters of reference marked thereon.

My invention relates to improvements in a saw for making spool-blanks or spools, small spokes, pins, and similar cylindrical wooden articles, whether the same are solid or hollow, and also for tenoning spokes and similar cylindrical articles; and the novelty therein consists in the particular construction of the saw, and in the combination and arrangement of the several operative parts, as more particularly hereinafter described and claimed.

For the better understanding of my invention, reference should be had to the accompanying drawings, in which—

Figure 1:
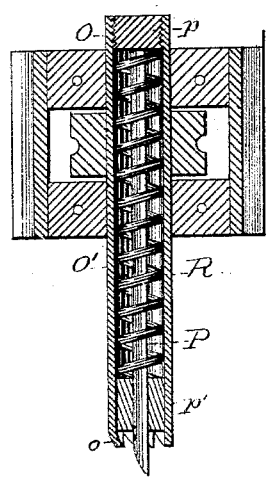
Figure 2:
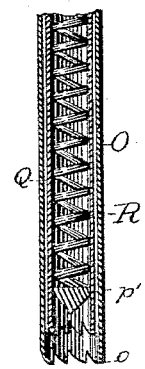
Figure 3:
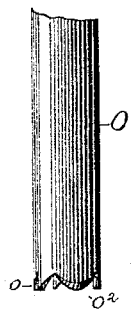
Figure 4:
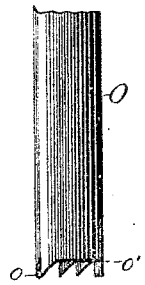

Figure 1 is a central vertical section of the saw with an interior boring-bit; Fig. 2, a similar view of the saw with an interior tenoning-saw; Fig. 3, an exterior view of the saw, showing the arrangement of its lip; and Fig. 4, a similar view showing the arrangement of its clearing-space.

The saw O, which is the subject of this application, and is adapted for rotation and up-and-down feed, is a hollow cylinder, composed of two parts, the lower part, O', for convenience of repair, replacement, or sharpening, being connected with the upper part by screw-threads, and while this part should be made of proper steel, the upper part may be of cast or wrought iron. This saw is armed at its cutting-end with suitable teeth, $o$—either a part of the saw or inserted—which occupy the larger part of the periphery of the end of the saw.

When used for rough work, that part of the saw marked $o'$ has no teeth to prevent the escape of sawdust. When used for fine work or finishing work, instead of the space $o'$, the saw has a lip, $o^2$, with rounded outlines, as shown, and sharp cutting inner edges, which pare off the roughness left by the teeth. In the interior of this saw is a boring-bit, P, (preferably with a square shank,) supported by block $p$, and passing through an ejector, $p'$, on the end of a spiral spring, R, which encircles said bit between the block $p$ and ejector $p'$. This bit has either the same vertical movement and rotation as the saw, or an independent vertical movement and rotation, or both an independent vertical movement and rotation, in which case it would require a separate feed and pulley from the saw, and its blocks would need to be loose within the saw, or else the shank would need to be round.

When arranged for tenoning, instead of the bit P within the saw O, I use another cylindrical saw, Q, of the size required, at the proper distance above the cutting-end of the saw O, and this saw Q is supported, fed, and revolved as before described with regard to the bit P.

Whether the bit or the tenoning-saw is used, I employ the spiral spring R and ejector $p'$ within the saw O, which, as the saw is fed down in its work, is compressed by the wood which enters the saw, and when the work is done expels the wood from the interior of the saw.

I claim—

1. A hollow saw consisting of a cylinder provided on its cutting-end with a series of uniform cutting-teeth, and a clearing-space, intermediate two of said teeth, substantially as and for the purpose set forth.

2. A hollow saw provided on its cutting-end with a series of uniform cutting-teeth, and a lip located intermediate two of said teeth, and having rounded outlines and sharp cutting inner edges, substantially as described.

3. A hollow saw made in two parts, combined with a central tenoning-saw, Q, a spiral spring, R, arranged within said central saw, and an ejector, $p'$, attached to the end of said spring, substantially as described and shown.

4. A hollow saw made in two parts, combined with a boring-bit passing through an ejector on the end of a spiral spring encircling said bit between its support and the ejector, substantially as and for the purpose set forth.

In testimony whereof I affix my signature in presence of two witnesses.

GRANVILLE ROWELL.

Witnesses:
OTIS F. R. WAITE,
M. E. SABINE.